United States Patent [19]
Riensche

[11] Patent Number: 4,855,659
[45] Date of Patent: Aug. 8, 1989

[54] ELECTROPNEUMATIC POSITION REGULATOR

[75] Inventor: Heinrich Riensche, Bückeburg, Fed. Rep. of Germany

[73] Assignee: VDO Adolf Schindling AG, Frankfurt am Main, Fed. Rep. of Germany

[21] Appl. No.: 179,498

[22] Filed: Apr. 8, 1988

[30] Foreign Application Priority Data

Apr. 11, 1987 [DE] Fed. Rep. of Germany ....... 3712337

[51] Int. Cl.$^4$ ............................................. G05D 16/00
[52] U.S. Cl. ..................................... 318/645; 318/663; 137/83; 137/85; 137/487.5
[58] Field of Search .................. 318/645, 663; 137/83, 137/85, 487.5

[56] References Cited

U.S. PATENT DOCUMENTS

| | | | |
|---|---|---|---|
| 4,549,124 | 10/1985 | Beier | 318/663 |
| 4,579,137 | 4/1986 | Brandt | 137/85 |
| 4,638,830 | 1/1987 | Brown et al. | 137/83 |
| 4,722,360 | 2/1988 | Odajima et al. | 137/487.5 |

Primary Examiner—William M. Shoop, Jr.
Assistant Examiner—Saul M. Bergmann
Attorney, Agent, or Firm—Martin A. Farber

[57] ABSTRACT

An electropneumatic position regulator having a current/pressure transducer has, as electric input, at least one coil (11) fed with a current (setting signal), as well as a permanent magnet (16) whose relative position is variable as a function of the current for the adjustment of a nozzle/impact-plate arrangement (17, 18) of a pneumatic system. The position regulator serves for a pneumatic setting device (23) which has a stroke output and is connected with the nozzle/impact-plate arrangement. The position regulator furthermore comprises a position report device with an electric path transmitter (31) which is connected to the stroke output (32) of the setting device (23). The report signal from the electric path transmitter (31) is fed back to the electric input (coil 12) of the current/pressure transducer.

5 Claims, 1 Drawing Sheet

4,855,659

ELECTROPNEUMATIC POSITION REGULATOR

FIELD AND BACKGROUND OF THE INVENTION

The present invention relates to an electropneumtic position regulator.

In particular, the invention relates to an electropneumatic position regulator having a current/pressure transducer which has, as electric input, at least one coil which is fed with a current (setting signal), as well as a permanent magnet the relative position of which is variable as a function of the current for the adjustment of a nozzle/impact-plate arrangement of a pneumatic system, for a pneumatic setting device which is connected with the nozzle/impact-plate arrangement and which has a stroke output, and having a position return-report device between the path output and the transducer.

Such electropneumatic position regulators are intended to control the setting stroke of a pneumatic setting device, which is also known as a setting armature or servomotor, proportional to an electric input signal, i.e. a current. The setting device can, for instance, be used in accordance with the setting stroke, to adjust a valve with which a pressure, a flow, a temperature or other variables can be regulated.

One known electropneumatic regulator in a pressure system has, connected with an electric measurement transducer, a negative-feedback dc-voltage amplifier as well as a current/pressure transducer which controls the setting pressure of a pneumatic system for the actuating of the setting device (W. Oppelt, Kleines handbuch technischer Regelvorgänge [Brief Manual of Technical Control Processes], 1972, page 354, FIG. 28.19). In detail, the known current/pressure transducer is developed with a moving-coil system in which a moving coil is movably mounted by means of a balance arm opposite a fixed permanent magnet. One end of the balance arm is developed as impact plate facing a pneumatic nozzle which is fed with compressed air via a throttle of a pneumatic system. The pressure upstream of the throttle is adjusted by the force produced with the moving coil system corresponding to the current, which force affects the distance between the impact plate and the pneumatic nozzle. The displacement of the stroke by the pneumatic setting device arranged in the pneumatic system is effected corresponding to the pneumatic pressure. The stroke is transmitted, by means of a spring acting on a spindle of the setting device as opposing force to the balance arm, which is mounted directly on the setting device. The moving coil system, the balance arm, the nozzle/impact-plate system as well as the position report from the stroke output of the setting device via the spring form an electropneumatic follow-on mechanism with which the result is to be obtained that the setting stroke is proportional to the current fed into the moving coil system. This electropneumatic position regulator has the disadvantage that it is necessary to mount the vibration-sensitive parts, namely the current/pressure transducer with the nozzle/impact-plate system directly on the setting device.

By this arrangement disturbing variables, namely mechanical blows and vibrations which come from the setting device or are transferred by it, can be coupled into the nozzle/impact-plate system. Furthermore, the follow-on mechanism cannot be adapted in simple manner to the setting stroke of the setting device since the setting stroke is transferred as force to the balance arm. For adaptation, different springs or more complicated setting means would have to be provided, depending on the setting stroke provided.

SUMMARY OF THE INVENTION

It is an object of the present invention to develop an electropneumatic position regulator of the aforementioned type in such a way that it can be arranged, without complication, in a manner which is insensitive to shocks and vibrations of the setting device and can be easily adapted to the stroke of the setting device.

According to the invention, an electric path transmitter (potentiometer 31) is connected as position report device to the stroke output (shaft 320 of the setting device (23) the report signal of which is fed back to the electric input (coils 11, 12) of the current/pressure transducer.

The solution is based on the principle that the position report from the settling device does not take place directly as force on the current/pressure transducer but rather that the setting stroke is first of all converted into an electric signal by an electric path transmitter which is arranged on the stroke output of the setting device and which can be elecrically processed, and in particualr amplified, in suitable manner and adapted to the setting stroke and then again converted within the current/pressure transducer, similar to the setting signal but with opposite effect, into a force in such a manner that the desired relationship between the setting signal stored in the current/pressure transducer and the stroke of the setting device obtained. The current/pressure transducer can thus be completely mechanically uncoupled from the setting device. The electric path transmitter can be developed in such a manner that it converts substantially only the setting stroke tapped off, for instance, at a spindle of the setting device into an electric report signal, but not disturbing vibrations and blows which vibrate the setting device as a whole. In addition to this, due to the mounting of the current/pressure transducer remote from the setting device, said converter can be easily arranged in a place which is under less stress so that a higher dependability in operation of the current/pressure transducer is obtained without expensive measures for the encapsulating thereof with respect to the environment.

The lack of sensitivity of the electropneumatic position regulator to disturbing influences is furthered by development of the current/pressure transducer with a stationary soft-iron core (10) which is passed through the coil (11) and is closed between two pole shoes (13, 14) via an air gap (15) and with a permanent magnet (16) arranged movably in the region of attraction of the two pole shoes (13, 14).

In such a current/pressure transducers the coil and its soft-iron core can be arranged fixed in place. As permanent magnet there is sufficient a relatively small magnet which thus has only a slight movable mass and little inertia. As a result of its low mass, disturbing forces can scarcely be produced by it upon excitation from the outside. At relatively slight structural expense, great ruggedness can in this way be obtained. In addition to this, this current/pressure transducer is characterized by very good linearity upon the conversion of the current into force.

For the processing of the report signal which is to be fed into the current/pressure transducer and which is produced by the electric path transmitter there is advisedly provided an amplifier with adjustment elements for the proportional region of the setting regulator and for adaptation to the stroke of the setting device, wherein an electronic amplifier (5) is arranged between the electric path transmitter (potentiometer 31) and the electric input (coil 12) of the current/pressure transducer, the amplifier having setting elements (36, 9) for the proportional region of the position regulator and for adaptation to the stroke of the pneumatic setting device (23).

In detail, these setting elements are advisably developed and arranged in the manner that for the adjustment of the proportional region the input (coil 12) of the curren/pressure transducer is connected via a potentiometer (36) to the amplfier output and that an adjustable negative feedback resistor (9) serves for adaptation to the stroke. The two setting elements are uncoupled from each other by the electronic amplifier or the amplifier stages so that they do not affect each other. The electronic amplifier furthermore makes possible a good adaptation of the electric path transmitter to the input or coil of the current/pressure transducer.

According to a further feature of the invention, a potentiometer (31) is provided as the electric path transmitter.

In particularly advantageous manner, the electropneumatic position regulator is constructed such that the soft-iron core (10) of the transducer is passed through a second coil (12) which is galvanically insulated from the first coil (11) and fed from the output of the electronic amplifier (5), and that the voltage supply of the electronic amplifier (5) and of the potentiometer (31) takes place over Zener diodes (26, 27) from the current (setting signal) which is fed into the first coil (11). In this embodiment the electronic amplifier and the electric path transmitter do not require any additional electric auxiliary energy. Rather, the necessary voltage supply is derived from the input signal which should not drop below a predetermined voltage. The current supply is tapped off from Zener diodes in the input circuit of the coil of the current/pressure transducers into which the setting signal is fed. A second coil which is galvanically insulated from the first coil is fed with the output current of the electronic amplifier corresponding to the report signal. The current of the setting signal and the output current of the electronic amplifier corresponding to the return signal are thus substantially decoupled galvanically from each other. The output current of the electronic amplifier produces in the current/pressure transducer a force which displaces the nozzle/impact-plate system and counteracts the displacement of the nozzle/impactplate system caused by the input signal or the corresponding current so that force compensation takes place in the current/pressure transducer, although this force is not produced directly by the stroke output of the setting device, for instance by a spring.

BRIEF DESCRIPTION OF THE DRAWINGS

With the above and other objects and advantages in view, the present invention will become more clearly understood in connection with the detailed description of a preferred embodiment, when considered with the accompanying drawings, of which:

The sole FIGURE is a circuit diagram of the invention.

DETAILED DESCRIPTION OF THE PREFERRED EMBODIMENT

Figure 1:
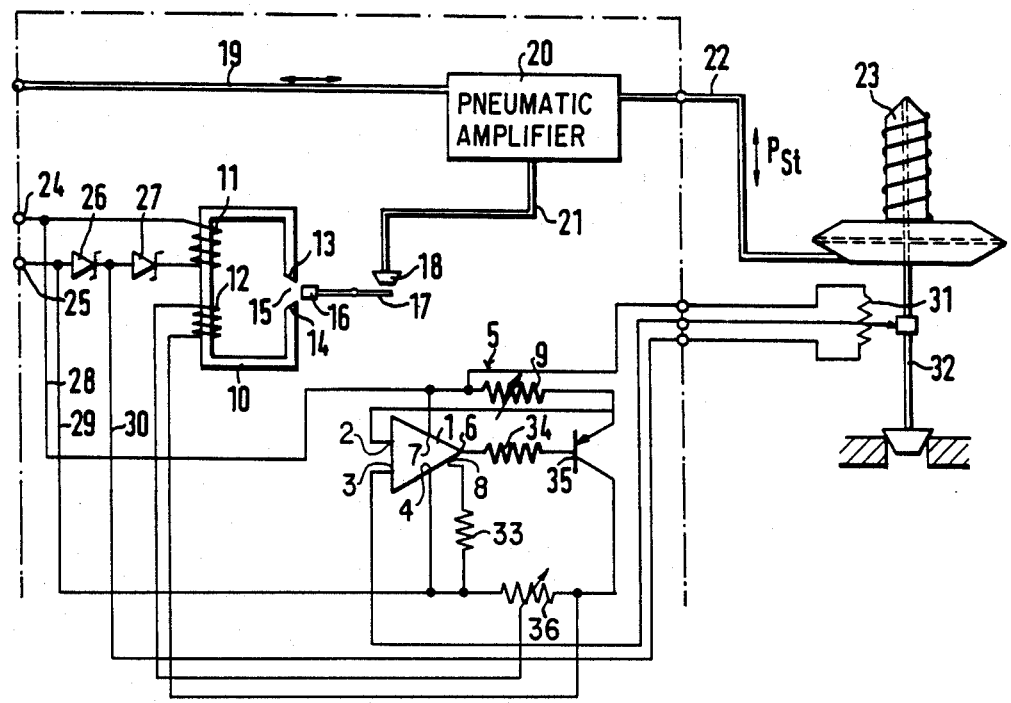

An essential component of the electropneumatic position regulator is a current/pressure transducer having a softiron core 10 which is passed through two coils 11 and 12. The soft-iron core 10 has an air gap 15 between pole shoes 13, 14. Directly in front of the air gap, a permanent magnet 16 of a material of high coercive force is arranged on a balance arm 17 with which it is swingable. On the opposite end of the balance arm there is, spaced from it, an air nozzle 18 whose outlet opening is opposite an impact plate, the balance arm 17 being configured as an impact plate (no reference number) at this end of the balance arm. The air nozzle is fed from air feed line 19 via a throttle, not shown. Within a pneumatic amplifier 20, a pneumatic amplifier element can be connected to the line 21 which leads to the air nozzle 18. From the output of the amplifier element, a line 22 leads to a pneumatic setting device 23 so as to act on the latter with a setting pressure $P_{st}$ which is dependent on the position of the balance arm 17 and/or the impact plate with respect to the air nozzle 18.

The coil 11 of the current/pressure transducer is acted on, via terminals 24, 25 by a current as setting signal. In this connection, a minimum voltage is present on the terminals 24 and 25 from which operating voltages of an electronic amplifier 5 and of a potentiometer 31 can be derived for the position report. These operating voltages are fed via the lines 28, 29, 30.

A wiper of the potentiometer which is arranged for the position report on the setting device 23 is displaced by a shaft 32 of the setting device in accordance with the stroke thereof. The wiper which thus gives off an electric report signal is connected to a report signal input 3 of a dc voltage amplifier element 1 in the electronic amplifier 5. This dc voltage amplifier element has terminals, designated 4, 7 and 8, for the voltage supply or bias-voltage supply, which are connected either directly to the lines 29, 28 or via a series resistor 33 to the line 29. An output 6 of the dc voltage amplifier element is connected, via a coupling resistor 34, to a base of a transistor 35 whose collector is connected to the potentiometer 36. The coil 12, which is fed with the amplified turn signal, is connected to the collector of the transistor 35. The potentiometer 36 serves for adjusting the proportional region of the position regulator. The emitter of the transistor 35 is connected via an adjustable negative-feedback resistor 9 to the other line 28 of the voltage supply. Furthermore, the emitter is fed back to the negative-feedback input 2 of the dc amplifier element 1. The negative-feedback coupling resistor 9 serves for adapting the position regulator to the stroke of the setting device 23. The smaller the negative-feedback coupling resistance is set, the weaker the negative feedback, since the emitter potential of the transistor 3 is held more and more strongly to the potential on the line 28.

The electropneumatic position regulator operates in the manner that by the current of the setting signal which flows through the coil 11 a force is exerted on the permanent magnet 16 which has tendency to shift the distance between the balance arm 17 or impact plate and the air nozzle 18 so as to open or close the pneumatic amplifier 20 in line with the setting signal. Accordingly, the setting pressure $P_{st}$ assumes a value which is converted into a corresponding stroke at the shaft 32 of the setting device 23. Between the setting signal at the terminals 24 and 25 and the stroke of the spindle 32 there is initially not necessarily a linear relationship even if the current/pressure transducer operates linearly, which can be caused, for instance, by the characteristic curve of the setting device. On the other hand, however, a large change in the setting pressure and thus of the stroke can be expected as a result of the high amplification of the current/pressure transducer even with small changes in the setting signal as long as the position reporting device is not active. For example, 1% of the dc setting signal as sufficient in order fully to control the pneumatic amplifier 20.

In order to establish the desired relationship between the setting signal and the stroke, the position report device operates as follows:

The potentiometer 31 produces a voltage which is proportional to the stroke and with which the dc voltage amplifier element 1—input 3—is acted upon. The voltage amplified via the amplifier element 1 drives through the transistor 35, corresponding to the adjustment of the negative-feedback resistor 9, a compensating output current through the coil 12. The value of the compensating output current depends in this connection on the adjustment of the potentiometer 36, so that by the latter the resultant proportional region of the entire position regulator can be adjusted, for instance, between 1 and 5%. The compensation by the output current acts in the manner that the magnetic flux caused by the output current in the soft-iron core 10 amd the air gap 15 acts in opposition to the flux which is produced by the setting signal in the coil 11. Accordingly, the force which is exerted by the output current on the permanent magnet also acts in opposition to the force which is caused by the above-described displacement of the balance arm. As a result, the distance between the air nozzle 18 and the impact plate or balance arm 17 is so adjusted that the stroke of the shaft 32 is strictly proportional to the setting signal at the terminals 24 and 25 with the adjusted proportional range of the position transmitter without overcontrolilng one of the amplifiers of the position regulator. However, it is pointed out that, instead of the proportionality between setting signal and stroke, other relationships of the curves between setting signal and stroke can be pre-established with high accuracy if the position report device is suitably modified with the electric path transmitter, namely the potentiometer 31, and the electronic amplifier 30.

I claim:
1. An electropneumtic position regulator comprising:
   a current/pressure transducer;
   a pneumatic system having a nozzle/impact-plate assembly for operating the transducer;
   an electric input circuit having at least one coil to be fed with a current setting and a permanent magnet for which the relative position is variable as a function of the current for adjustment of the nozzle/impact-plate assembly;
   a pneumatic setting device which is connected with the nozzle/impact-plate system, and has a shaft stroke output, the setting device including a position reporting device between the shaft output and the transducer; and wherein
   the reporting device outputs an electric report signal which is fed back to a coil of the electric input circuit; and wherein
   the input circuit includes a first coil to be energized with said setting current, and a second coil magnetically coupled thereto, the regulator further comprising
   an electronic amplifier arranged between the reporting device and the second coil of the input circuit, the amplifier having setting elements for establishing a linear region of the position regulator to match a stroke of the pneumatic setting device.

2. A regulator according to claim 1, wherein
   the input circuit has a stationary soft-iron core which is threaded through said at least one coil and terminates in two pole shoes defining an air gap, there being a premanent magnet arranged movably in the region of attraction of the two pole shoes, the permanent magnet being operatively coupled to an impact plate of the nozzle/impact-plate assembly.

3. A regulator according to claim 1, wherein
   said setting elements comprise a potentiometer and an adjustble negative feedback resistor, and wherein
   for the adjustment of the linear region, said second coil is connected via the potentiometer to an output of the amplifier, the amplifier including said adjustable negative feedback resistor for matching the linear region to the stroke of the setting device.

4. A regulator according to claim 1, wherein the reporting device comprises
   a potentiometer.

5. A regulator according to claim 1, wherein the input circuit includes
   a soft-iron core which threads the first and the second coil, the second coil being galvanically insulated from the first coil and being fed from an output of the electronic amplifier; and wherein
   said input circuit has input terminals for receiving said setting current;
   said reporting device comprises a potentiometer, and said input circuit includes two serially connected Zener diodes connected to one of said input terminals of the input circuit; and
   a supply voltage of the electronic amplifier and for the potentiometer of the reporting device is applied via said Zener diodes from the setting current, the setting current being fed into the first coil.

* * * * *